(12) United States Patent
Jain et al.

(10) Patent No.: US 8,561,163 B2
(45) Date of Patent: Oct. 15, 2013

(54) MAINTAINING THE INTEGRITY OF EMAIL AUTHORSHIP

(75) Inventors: Rajat Jain, Raleigh, NC (US); Ahmed M. Omar, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 12/630,200

(22) Filed: Dec. 3, 2009

(65) Prior Publication Data

US 2011/0138479 A1     Jun. 9, 2011

(51) Int. Cl.
*H04L 29/06* (2006.01)
(52) U.S. Cl.
USPC .................................. 726/8; 726/1; 715/770
(58) Field of Classification Search
USPC ........................... 726/1, 8; 715/203, 751, 770
See application file for complete search history.

(56) References Cited

U.S. PATENT DOCUMENTS

| 5,958,005 | A | 9/1999 | Thorne et al. |
| 6,366,933 | B1* | 4/2002 | Ball et al. ...................... 715/203 |
| 6,701,345 | B1 | 3/2004 | Carley et al. |
| 6,732,101 | B1* | 5/2004 | Cook .................................. 1/1 |
| 6,938,065 | B2 | 8/2005 | Jain |
| 7,373,330 | B1 | 5/2008 | Klebe |
| 2002/0162000 | A1* | 10/2002 | Benzler .......................... 713/170 |
| 2003/0217259 | A1 | 11/2003 | Wong et al. |
| 2004/0205205 | A1 | 10/2004 | Patterson |
| 2005/0010607 | A1* | 1/2005 | Parker et al. ................... 707/200 |
| 2007/0288859 | A1* | 12/2007 | Vuong et al. ................... 715/770 |
| 2008/0250329 | A1* | 10/2008 | Stefik et al. .................... 715/751 |
| 2008/0250474 | A1* | 10/2008 | Bhogal et al. ..................... 726/1 |

OTHER PUBLICATIONS

Marc A Smith, "Forward Thinking", 2009, Second Conference on Email and Anti Spam.*
Rahaman, "Distributed Access Control for XML Document Center Collaborations", 2008, IEEE, p. 267-276.*

* cited by examiner

*Primary Examiner* — David Pearson
*Assistant Examiner* — Gregory Lane
(74) *Attorney, Agent, or Firm* — Brandon C. Kennedy; Thomas E. Tyson; Biggers & Ohanian, LLP

(57) ABSTRACT

Maintaining the integrity of email authorship including receiving, by a receiving email client, an email message containing content created by a sender; identifying, in dependence upon the email message, an edit authority value; receiving, from a recipient of the email message, an instruction to forward the received email message; receiving, from the recipient, an instruction to edit the content contained in the received email message; and determining, in dependence upon the edit authority value, whether to allow the recipient to edit the content; if the recipient is allowed to edit the content, determining, in dependence upon the edit authority value, whether to enforce edit tracking in the content; and forwarding the email message with the recipient's edits tracked if edit tracking is enforced; or forwarding the email message with the recipient's edits untracked if edit tracking is not enforced.

20 Claims, 5 Drawing Sheets

MAINTAINING THE INTEGRITY OF EMAIL AUTHORSHIP

BACKGROUND OF THE INVENTION

1. Field of the Invention

The field of the invention is data processing, or, more specifically, methods, apparatus, and products for maintaining the integrity of email authorship.

2. Description of Related Art

In conventional email communications, when a user receives an email thread that was forwarded or replied to, the user has no way of knowing whether the content of the email prior from the last sender is authentic. In such systems, when a user is replying or forwarding an email thread, that forwarding or replying user has access to edit or modify the content of the email of the prior sender. Such edits are often made with good intentions because the user may add additional information, may clarify the content, or correct the content of the prior email. However, such edits may be malicious because the user may deliberately manipulate or outright fabricate the content of the email.

SUMMARY OF THE INVENTION

Maintaining the integrity of email authorship including receiving, by a receiving email client, an email message containing content created by a sender; identifying, by the receiving email client in dependence upon the email message, an edit authority value established by the sender of the email message for that content; receiving, by the receiving email client from a recipient of the email message, an instruction to forward the received email message; receiving, by the receiving email client from the recipient, an instruction to edit the content created by the sender contained in the received email message; and determining, by the receiving email client in dependence upon the edit authority value, whether to allow the recipient to edit the content; if the recipient is not allowed to edit the content, forwarding, by the receiving email client, the email message without altering the content created by a sender; if the recipient is allowed to edit the content, determining, by the receiving email client in dependence upon the edit authority value, whether to enforce edit tracking in the content; and receiving edits from the recipient, including the edits in the content created by the sender with edit tracking, and forwarding, the email message with the recipient's edits tracked if edit tracking is enforced; or receiving edits from the recipient, including the edits in the content created by the sender without edit tracking, and forwarding the email message with the recipient's edits untracked if edit tracking is not enforced.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
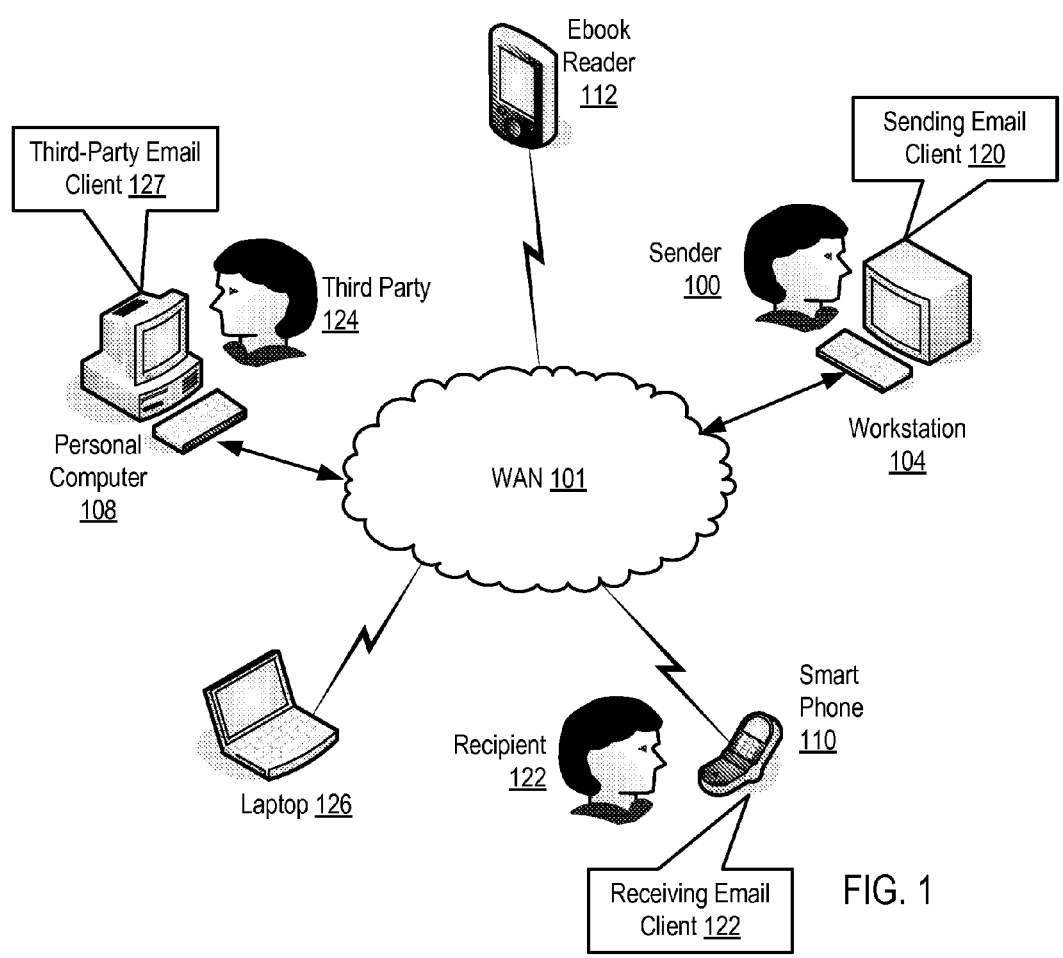
FIG. 1 sets forth a network diagram of a system for maintaining the integrity of email authorship according to embodiments of the present invention.

Exemplary methods, apparatus, and products for maintaining the integrity of email authorship in accordance with the present invention are described with reference to the accompanying drawings, beginning with FIG. 1. FIG. 1 sets forth a network diagram of a system for maintaining the integrity of email authorship according to embodiments of the present invention. The system of FIG. 1 includes a number of devices, a personal computer (108), an Ebook reader (112), a workstation (104), a smart phone (110), and a laptop (126) coupled for data communications through a wide area network ('WAN') (101). Each of the devices (108, 112, 104, 110, and 126) of FIG. 1 has installed upon it an email client that includes an authorship integrity maintenance module capable of maintaining the integrity of email authorship in accordance with the present invention.

Email, electronic mail, is a method of exchanging digital messages, designed primarily for human use. Email messages are the digital messages so exchanged. Email systems are typically based on a store-and-forward model in which email computer server systems accept, forward, deliver and store messages on behalf of users, who only need to connect to the email infrastructure, typically an email server, with a network-enabled device, such as any of the devices (108, 112, 104, 110, 126) of FIG. 1, for the duration of message submission or retrieval.

An email message typically consists of two components, the message header, and the message body, which is the email's content. The message header contains control information, typically including, minimally, a sender's email address and one or more recipient addresses. Usually additional information is added, such as a subject header field and so on.

An email client is a software application to compose, send, receive and view email messages. Often such email clients are installed directly onto a client device, however, in other embodiments of the present invention, an email client may be accessed though a data communications network. Examples of email clients capable of being modified to maintain the integrity of email authorship in accordance with the present invention include Microsoft Outlook™, Outlook Express, and Eudora.

The system of FIG. 1 is capable of maintaining the integrity of email authorship according to embodiments of the present invention. In the example of FIG. 1, the sending email client (120) receives from a sender (100) content in an email message and an edit authority value for the email message containing the content created by the sender (100). An edit authority value is a value that invokes rules defining the degree to which the content created by the sender (100) may be edited by a recipient of that email message when forwarding the email message to another third party. Edit authority values may, in some embodiments of the present invention, be implemented as numeric values that invoke particular rules that establish a degree to which content created by a sender (100) may be edited by a recipient upon forwarding the email message. For example, a numeric value of '1' may be used as an edit authority value to establish that no editing whatsoever of the content created by the sender is allowed by a recipient when forwarding the email message. In such an example, a value of '2' may be used as an edit authority value to establish that the content created by the sender may be edited by a recipient upon forwarding the email message, but the edits made by the recipient must be tracked and made demonstrable through edit tracking in the email message forwarded to a third party. In such an example, a value of '3' may be used as an edit authority value to establish that the content created by the sender may be edited upon forwarding the email message and those edits may be included without any edit tracking but the forwarded email message must include a notification that the content created by the sender was edited. In such an example, a value of '4' may be used as an edit authority value to establish that the content created by the sender may edited and those edits may be included without any edit tracking and the email message may be forwarded without any notification that the content created by the sender was edited in the forwarded email message.

The exemplary numeric values for edit authority values and the rules they invoke are included for example and not for limitation. In fact, edit authority values may be implemented in a number of ways such symbols, characters, words, or any other value that will occur to those of skill in the art and the degree to which the content created by a sender may be edited in response to those values may also vary in many was as will occur to those of skill in the art.

The sending email client (120) of FIG. 1 is also capable of associating the edit authority value with the email message typically by including metadata with the email message containing the content created by the sender. An edit authority value may be recorded in a header field of the email message. Email systems typically include the ability to create and use custom headers. Such a custom header may be used to contain an edit authority value according to the present invention. The sending email client (120) of FIG. 1 is also capable of sending the email message containing the content created by the sender (100) to a receiving email client (122) for the recipient (122) of the email message. Such an email message may be sent according to any number of email protocols such as Post Office Protocol (POP), Internet Message Access Protocol ('IMAP'), Simple Mail Transfer Protocol ('SMTP'), Mail Submission Agent ('MSA'), Hypertext Transfer Protocol ('HTTP'), and others as will occur to those of skill in the art.

The receiving email client (122) of FIG. 1 is capable of maintaining the integrity of email authorship according to the present invention by receiving an email message containing content created by a sender (100); identifying, in dependence upon the email message, an edit authority value established by the sender of the email message for that content. Such an edit authority value may be contained in a header of the email message.

The receiving email client (122) of FIG. 1 is also capable of receiving an instruction from the recipient (122) to forward the received email message to a third party email client (127) to be displayed to a third party (124) and receiving an instruction to edit the content created by the sender (100) contained in the received email message.

Upon receiving an instruction to edit the content created by the sender, the receiving email client (122) of FIG. 1 is capable of determining whether to allow the recipient to edit the content. The receiving email client (122) of FIG. 1 determines whether to allow the recipient to edit the content in dependence upon the edit authority value in the email message. As mentioned above, in some cases, an edit authority is used to disallow all editing of content created by the sender to limit or control the manner in which edits may be made to the content created by the sender. If the recipient is not allowed to edit the content, the receiving email client (122) of FIG. 1 is capable of forwarding the email message without altering the content created by a sender to the email client of a third party (127). When forwarding the email message without altering the content created by a sender the receiving email client (122) of FIG. 1 is capable of including with the email message an integrity notification identifying that the content created by the user was not altered. Such an integrity notification may be implemented as an icon in the email message, a notification in the email message, an earcon associated with the email message, or any other notification that will occur to those of skill in the art. When forwarding the email message without altering the content created by a sender the receiving email client (122) of FIG. 1 is also capable of sending a courtesy copy of the forwarded email message to the sender (122).

If the recipient is allowed to edit the content, the receiving email client (122) of FIG. 1 is also capable of determining, in dependence upon the edit authority value, whether to enforce edit tracking in the content. Edit tracking is the function of monitoring the changes made in the content of the email messages. Such edit tracking may include an identification of who made the changes, what the changes were, what time the changes were made, and so on. Often the changes or edits in the content are made visually demonstrable by using underlining, highlighting, or other visual representation to show the words or symbols that are added and using strikethrough, highlighting, or other visual representation to show the words or symbols that were deleted.

The receiving email client (122) of FIG. 1 is also capable of receiving edits from the recipient (122), including the edits in the content created by the sender with edit tracking, and forwarding, the email message with the recipient's edits tracked if edit tracking is enforced. The receiving email client (122) of FIG. 1 is also capable of sending a courtesy copy of the forwarded email message to the sender.

The received email client (122) is also capable of receiving edits from the recipient (122), including the edits in the content created by the sender without edit tracking, and forwarding the email message with the recipient's edits untracked if edit tracking is not enforced. The receiving email client (122) of FIG. 1 is also capable of sending a courtesy copy of the forwarded email message to the sender.

The exemplary use of a sending email client (120), a receiving email client (122), and a third-party email client (127) are for explanation and not for limitation. In fact, email clients improved for maintaining the integrity of email authorship according to the present invention may function in all three modes, that is, they may function as sending email clients, receiving email clients, and third-party email clients.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art.

Various embodiments of the present invention may be implemented on a variety of hardware platforms in addition to those illustrated in FIG. 1.

Maintaining the integrity of email authorship in accordance with the present invention is generally implemented with computers, that is, with automated computing machinery. In the system of FIG. 1, for example, all the devices are implemented to some extent at least as computers. For further explanation, therefore, FIG. 2 sets forth a block diagram of automated computing machinery comprising an exemplary computer (152) useful in maintaining the integrity of email authorship according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an email client (430) that includes an authorship integrity maintenance module (429), a module of computer program instructions for maintaining the integrity of email authorship according to embodiments of the present invention. The email client (430) improved with the authorship integrity maintenance module (429) of FIG. 2 is capable of maintaining the integrity of email authorship by receiving, by a receiving email client, an email message containing content created by a sender; identifying, by the receiving email client in dependence upon the email message, an edit authority value established by the sender of the email message for that content; receiving, by the receiving email client from a recipient of the email message, an instruction to forward the received email message; receiving, by the receiving email client from the recipient, an instruction to edit the content created by the sender contained in the received email message; determining, by the receiving email client in dependence upon the edit authority value, whether to allow the recipient to edit the content; if the recipient is not allowed to edit the content, forwarding, by the receiving email client, the email message without altering the content created by a sender; if the recipient is allowed to edit the content, determining, by the receiving email client in dependence upon the edit authority value, whether to enforce edit tracking in the content; and receiving edits from the recipient, including the edits in the content created by the sender with edit tracking, and forwarding, the email message with the recipient's edits tracked if edit tracking is enforced; or receiving edits from the recipient, including the edits in the content created by the sender without edit tracking, and forwarding the email message with the recipient's edits untracked if edit tracking is not enforced.

Figure 2:
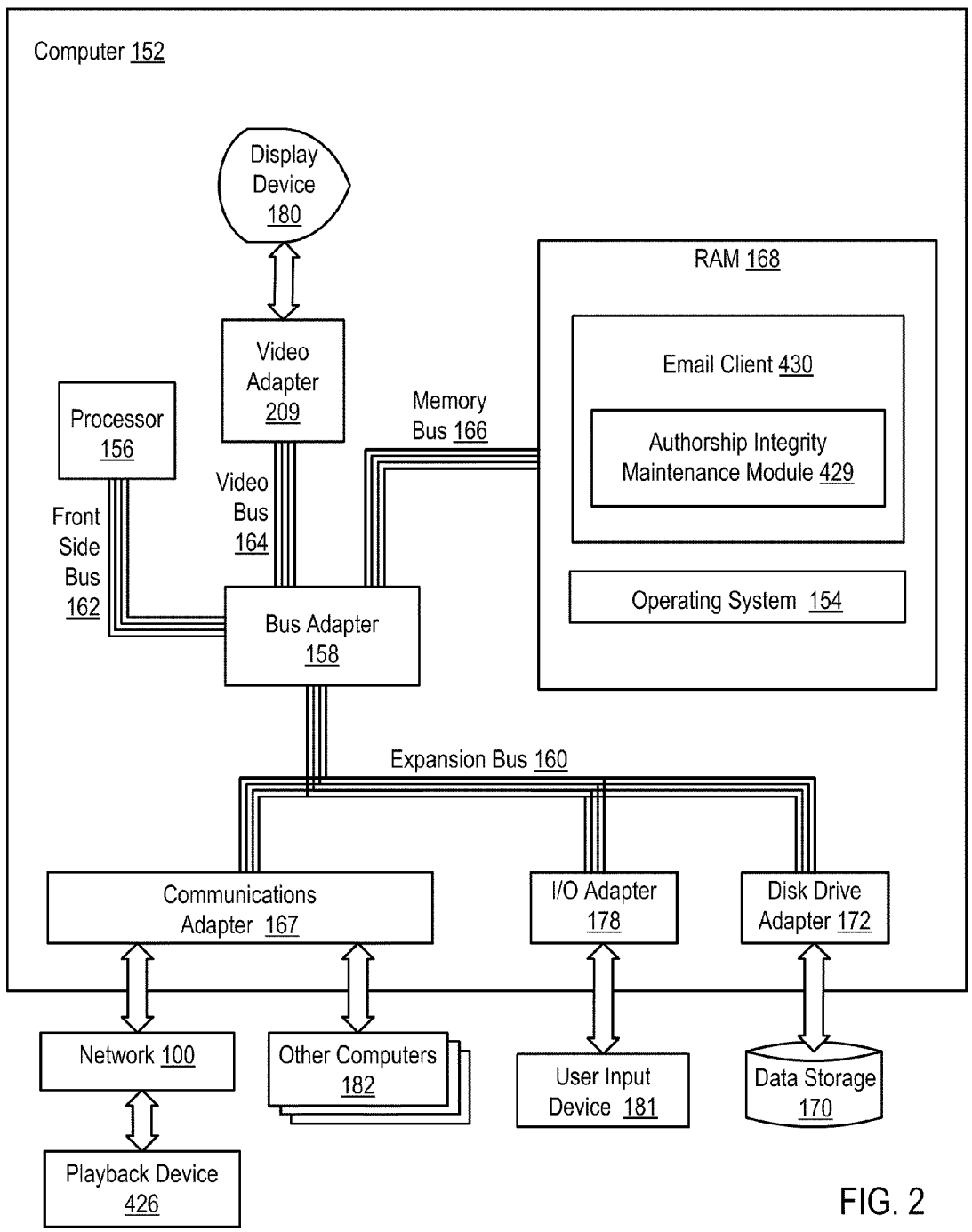
FIG. 2 sets forth a block diagram of automated computing machinery comprising an exemplary computer useful in maintaining the integrity of email authorship according to embodiments of the present invention.

The email client (430) improved with the authorship integrity maintenance module (429) of FIG. 2 is also capable of receiving, by a sending email client from a sender, an edit authority value for the email message containing content created by a sender.

When forwarding the email message with the recipient's edits tracked if edit tracking is enforced the email client (430) improved with the authorship integrity maintenance module (429) of FIG. 2 is capable of sending a courtesy copy of the forwarded email message to the sender. When forwarding the email message with the recipient's edits untracked if edit tracking is not enforced the email client (430) improved with the authorship integrity maintenance module (429) of FIG. 2 is capable of sending a courtesy copy of the forwarded email message to the sender.

When forwarding the email message without altering the content created by a sender the email client (430) improved with the authorship integrity maintenance module (429) of FIG. 2 is capable of including with the email message an integrity notification identifying that the content created by the user was not altered. And when forwarding the email message without altering the content created by a sender the email client (430) improved with the authorship integrity maintenance module (429) of FIG. 2 is capable of sending a courtesy copy of the forwarded email message to the sender.

Also stored in RAM (168) is an operating system (154). Operating systems useful for maintaining the integrity of email authorship according to embodiments of the present invention include UNIX™ Linux™ Microsoft XP™, AIX™ IBM's i5/OS™ and others as will occur to those of skill in the art. The operating system (154), email client (430) and authorship integrity maintenance module (429) in the example of FIG. 2 are shown in RAM (168), but many components of such software typically are stored in non-volatile memory also, such as, for example, on a disk drive (170).

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for [preamble] according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for [preamble] according to embodiments of the present invention include modems for wired dial-up communications, Ethernet (IEEE 802.3) adapters for wired data communications network communications, and 802.11 adapters for wireless data communications network communications.

Figure 3:
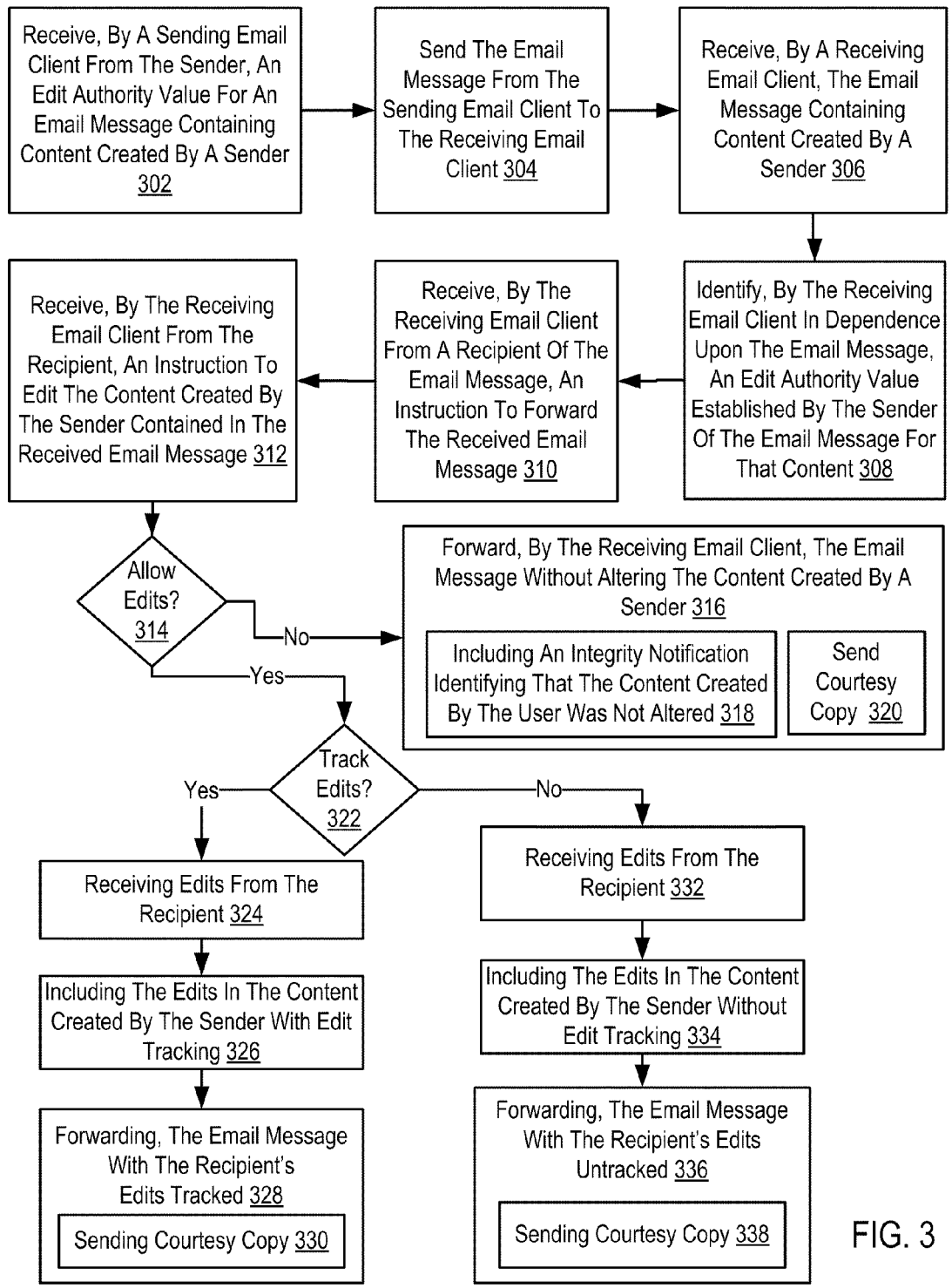
FIG. 3 sets forth a flow chart illustrating an exemplary method for maintaining the integrity of email authorship according to embodiments of the present invention.

For further explanation, FIG. 3 sets forth a flow chart illustrating an exemplary method for maintaining the integrity of email authorship according to embodiments of the present invention. The method of FIG. 3 includes receiving (302), by a sending email client from the sender, an edit authority value for the email message containing content created by a sender. As mentioned above, an edit authority value is a value that invokes rules defining the degree to which the content created by the sender may be edited by a recipient of that email message when forwarding the email message to another third party. Such an edit authority values may be implemented as a numeric value, character, symbol, word, or any other value that will occur to those of skill in the art. Receiving (302), by a sending email client from the sender, an edit authority value for the email message containing content created by a sender may be carried out by receiving through a graphical user interface ('GUI') of the sending email client an edit authority value and including the edit authority value in the email message.

The method of FIG. 3 includes sending (304) the email message from the sending email client to the receiving email client and receiving (306), by a receiving email client, an email message containing content created by a sender. The email message of the example of FIG. 3 may be sent according a number of email protocols as will occur to those of skill in the art. Examples of email protocols include Post Office Protocol ('POP'), Internet Message Access Protocol ('IMAP'), Simple Mail Transfer Protocol ('SMTP'), Mail Submission Agent ('MSA'), Hypertext Transfer Protocol ('HTTP'), and others as will occur to those of skill in the art.

The method of FIG. 3 also includes identifying (308), by the receiving email client in dependence upon the email message, an edit authority value established by the sender of the email message for that content. Identifying (308), by the receiving email client in dependence upon the email message, an edit authority value established by the sender of the email message for that content according to the method of FIG. 3 may be carried out by reading the edit authority value from a header field of the email message.

The method of FIG. 3 also includes receiving (310), by the receiving email client from a recipient of the email message, an instruction to forward the received email message. Receiving (310), by the receiving email client from a recipient of the email message, an instruction to forward the received email message may include receiving through a graphical user interface ('GUI') an instruction to forward the email message such as receiving a user's invocation of a forward GUI button.

The method of FIG. 3 also includes receiving (312), by the receiving email client from the recipient, an instruction to edit the content created by the sender contained in the received email message. Receiving (312), by the receiving email client from the recipient, an instruction to edit the content created by the sender contained in the received email message receiving through a graphical user interface ('GUI') an instruction to edit the content created by the sender such as identifying a user moving a cursor onto the content created by the sender and receiving a user's invocation of a keyboard stroke in an attempt to edit the content.

The method of FIG. 3 also includes determining (314), by the receiving email client in dependence upon the edit authority value, whether to allow the recipient to edit the content. Determining (314), by the receiving email client in dependence upon the edit authority value, whether to allow the recipient to edit the content may be carried out by comparing the edit authority value with a rule set to determine whether the edit authority value for email message authorizes editing of the content created by the sender.

If the recipient is not allowed to edit the content, the method of FIG. 3 includes forwarding (316), by the receiving email client, the email message without altering the content created by a sender. In the method of FIG. 3, forwarding (316) the email message without altering the content created by a sender includes including (318) with the email message an integrity notification identifying that the content created by the user was not altered. Such an integrity notification may be implemented as an icon in the email message, a notification in the email message, an earcon associated with the email message, or any other notification that will occur to those of skill in the art.

In the method of FIG. 3, forwarding (316) the email message without altering the content created by a sender also includes sending (320) a courtesy copy of the forwarded email message to the sender. Sending (320) a courtesy copy of the forwarded email message to the sender may include inserting an identification of the sender in the email message such that a third party receiving the forwarded email message is made aware of the sender receiving a courtesy copy, sending a blind courtesy copy to the sender, or any other way of sending a courtesy copy of the email message to the sender that will occur to those of skill in the art.

If the recipient is allowed to edit the content, the method of FIG. 3 includes determining (322), by the receiving email client in dependence upon the edit authority value, whether to enforce edit tracking in the content. Edit tracking is the function of monitoring the changes made in the content of the email messages. Such edit tracking my include an identification of a user made the changes, what the changes were, what time the changes were made and so on. Often the changes or edits in the content are made visually demonstrable by using underlining, highlighting, or other visual representation to show the words or symbols that are added and using strikethrough, highlighting, or other visual representation to show the words or symbols that were deleted.

Determining (322), by the receiving email client in dependence upon the edit authority value, whether to enforce edit tracking in the content may be carried out by comparing the edit authority value with a rule set to determine whether the edit authority value for email message requires edit tracking to be enforced in any changes in the content created by the sender.

If edit tracking is enforced, the method of FIG. 3 includes receiving (324) edits from the recipient, including (326) the edits in the content created by the sender with edit tracking, and forwarding (328) the email message with the recipient's edits tracked. Receiving (324) edits from the recipient may be carried out by receiving a user's invocation of keystrokes, receiving a user's invocations of GUI functions, or any other way of receiving edits from a user that will occur to those of skill in the art.

Including (326) the edits in the content created by the sender with edit tracking may be carried out by displaying the email message the edits in a manner that visually demonstrates the changes to the content made by the recipient. Such edit tracking may include underlining, highlighting, or otherwise visually representing the words or symbols that are added to the content created by the sender and using strikethrough, highlighting, or otherwise visually reprehending the words or symbols that were deleted in the content created by a sender or any other way of edit tracking that will occur to those of skill in the art.

Forwarding (328) the email message with the recipient's edits tracked may be carried out by sending the email message to a third-party according to an email protocol such as, for example, Post Office Protocol ('POP'), Internet Message Access Protocol ('IMAP'), Simple Mail Transfer Protocol ('SMTP'), Mail Submission Agent ('MSA'), Hypertext Transfer Protocol ('HTTP'), or any other email protocol that will occur to those of skill in the art.

In the method of FIG. 3 forwarding (328) the email message with the recipient's edits tracked if edit tracking is enforced includes sending (330) a courtesy copy of the forwarded email message to the sender. Sending a courtesy copy of the forwarded email message to the sender may include inserting an identification of the sender in the email message such that a third-party receiving the forwarded email message is made aware of the sender receiving a courtesy copy, sending a blind courtesy copy to the sender, or any other way of sending a courtesy copy of the email message to the sender that will occur to those of skill in the art.

If edit tracking is not enforced, the method of FIG. 3 includes receiving (332) edits from the recipient, including (334) the edits in the content created by the sender without edit tracking, and forwarding (336) the email message with the recipient's edits untracked. Receiving (332) edits from the recipient, may be carried out by receiving a user's invocation of keystrokes, receiving a user's invocations of GUI functions, or any other way of receiving edits from a user that will occur to those of skill in the art.

Including (334) the edits in the content created by the sender without edit tracking may be carried out by inserting the recipient's edits into the content created by the sender without visual representation identifying the edits made by the recipient.

Forwarding (336) the email message with the recipient's edits untracked may be carried out by sending the email message to a third-party according to an email protocol such as, for example, Post Office Protocol ('POP'), Internet Message Access Protocol ('IMAP'), Simple Mail Transfer Protocol ('SMTP'), Mail Submission Agent ('MSA'), Hypertext Transfer Protocol ('HTTP'), or any other email protocol that will occur to those of skill in the art.

In the method of FIG. 3, forwarding (336) the email message with the recipient's edits untracked if edit tracking is not enforced includes sending (338) a courtesy copy of the forwarded email message to the sender. Sending a courtesy copy of the forwarded email message to the sender may include inserting an identification of the sender in the email message such that a third-party receiving the forwarded email message is made aware of the sender receiving a courtesy copy, sending a blind courtesy copy to the sender, or any other way of sending a courtesy copy of the email message to the sender that will occur to those of skill in the art.

Figure 4:
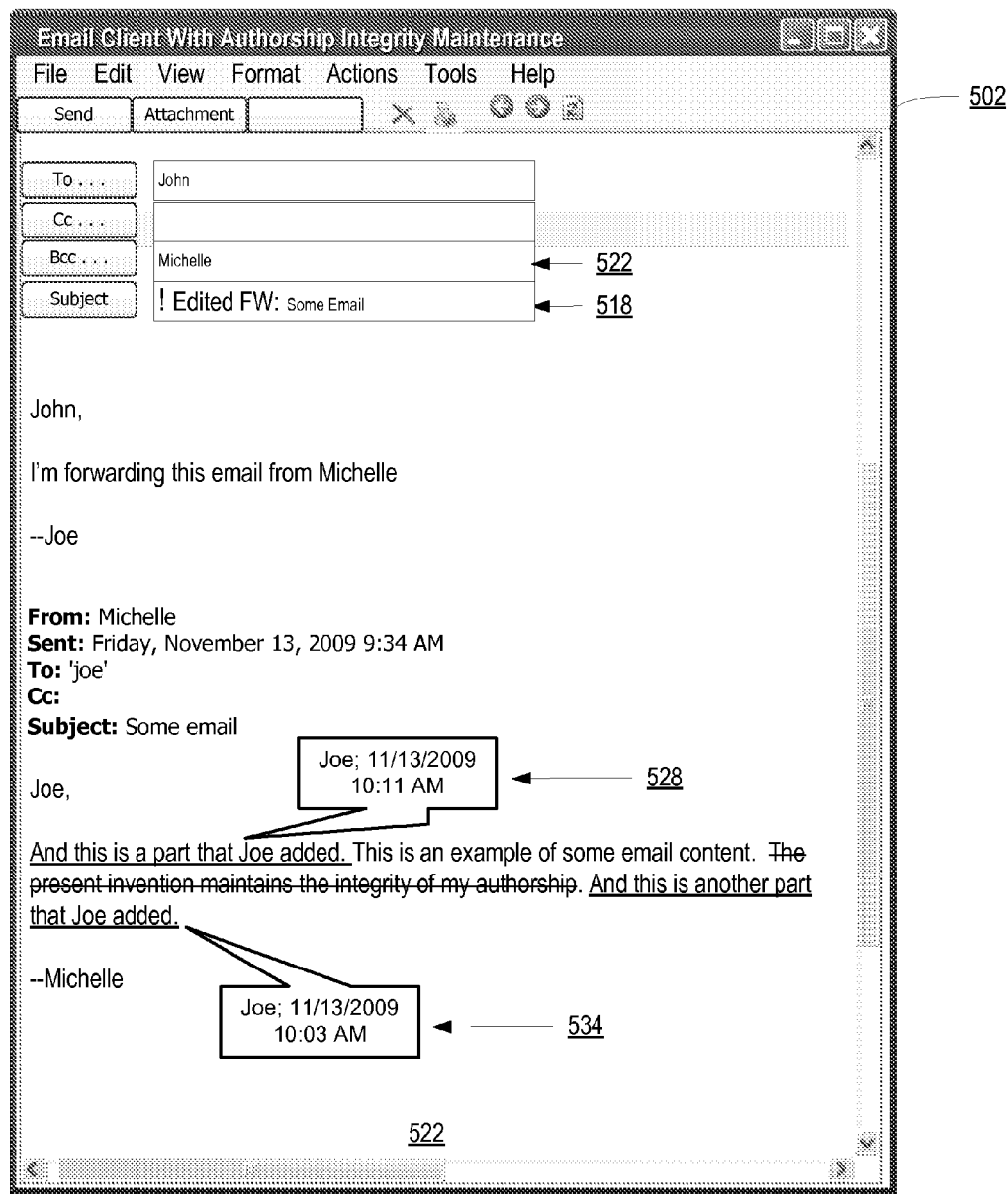
FIG. 4 sets forth a line drawing of a GUI display of an email client capable of maintaining the integrity of email authorship according to embodiments of the present invention.

For further explanation, FIG. 4 sets forth a line drawing of a GUI display of an email client (502) capable of maintaining the integrity of email authorship according to embodiments of the present invention. In the example of FIG. 4, an email message (522) having content created from a sender, Michelle, is edited by a recipient, Joe, and forwarded to a third party, John. In the example of FIG. 4, the subject line contains a notification (518) identifying the content created by Michelle was edited prior to forwarding the email message to the third party, John. Furthermore, in the example of FIG. 4, the sender Michelle is sent a blind courtesy copy (522) of the forwarded email message with the edits made by Joe tracked. In the example of FIG. 4, the edits are tracked using underlining to show the words added by Joe and strikethrough showing the words deleted by Joe. Also in the example of FIG. 4, a timestamp (528 and 534) shows the name of the recipient, Joe, that made the edits in the content created by the sender, and the date and time that edits were made.

Figure 5:
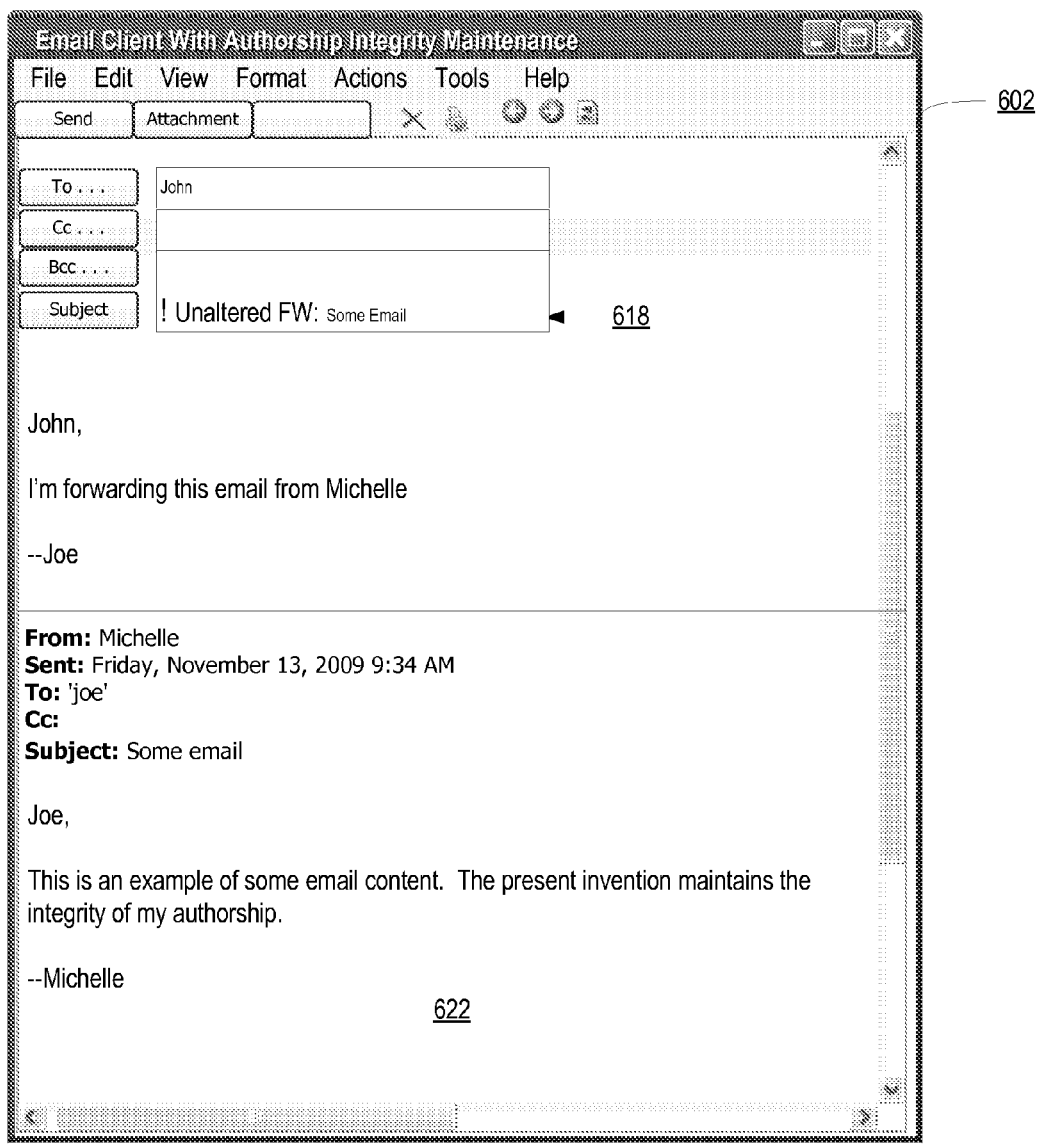
FIG. 5 sets forth a line drawing of another GUI display of an email client capable of maintaining the integrity of email authorship according to embodiments of the present invention.

For further explanation, FIG. 5 sets forth a line drawing of another GUI display of an email client (602) capable of maintaining the integrity of email authorship according to embodiments of the present invention. In the example of FIG. 5, an email message (622) having content created from a sender, Michelle, is not edited by the recipient, Joe, and forwarded to a third party without alteration of the original message from Michelle. In the example of FIG. 5, the subject line contains an integrity notification (618) identifying the content created by Michelle was not edited prior to forwarding the email message to the third party, John.

Exemplary embodiments of the present invention are described largely in the context of a fully functional computer system for maintaining the integrity of email authorship. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures of this application illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of maintaining the integrity of email authorship, the method comprising:
    receiving, by a receiving email client, an email message containing content created by a sender;
    identifying, by the receiving email client in dependence upon the email message, an edit authority value established by the sender of the email message for that content;
    receiving, by the receiving email client from a recipient of the email message, an instruction to forward the received email message;
    receiving, by the receiving email client from the recipient, an instruction to edit the content created by the sender contained in the received email message;
    determining, by the receiving email client in dependence upon the edit authority value, whether to allow the recipient to edit the content;
    if the recipient is not allowed to edit the content, forwarding, by the receiving email client, the email message without altering the content created by a sender;
    if the recipient is allowed to edit the content, determining, by the receiving email client in dependence upon the edit authority value, whether to enforce edit tracking in the content; and
        receiving edits from the recipient, including the edits in the content created by the sender with edit tracking, and forwarding, the email message with the recipient's edits tracked if edit tracking is enforced; or
        receiving edits from the recipient, including the edits in the content created by the sender without edit tracking, and forwarding the email message with the recipient's edits untracked if edit tracking is not enforced.

2. The method of claim 1 further comprising receiving, by a sending email client from the sender, an edit authority value for the email message containing content created by a sender.

3. The method of claim 1 wherein identifying, by the receiving email client in dependence upon the email message, an edit authority value established by the sender of the email message for that content further comprises reading the edit authority value from a header field of the email message.

4. The method of claim 1 wherein forwarding the email message with the recipient's edits tracked if edit tracking is enforced further comprises sending a courtesy copy of the forwarded email message to the sender.

5. The method of claim 1 wherein forwarding the email message with the recipient's edits untracked if edit tracking is not enforced further comprises sending a courtesy copy of the forwarded email message to the sender.

6. The method of claim 1 wherein forwarding the email message without altering the content created by a sender further comprises including with the email message an integrity notification identifying that the content created by the user was not altered.

7. The method of claim 1 wherein forwarding the email message without altering the content created by a sender further comprises sending a courtesy copy of the forwarded email message to the sender.

8. Apparatus for maintaining the integrity of email authorship, the apparatus comprising a computer processor, a computer memory operatively coupled to the computer processor, the computer memory having disposed within it computer program instructions capable of:
    receiving, by a receiving email client, an email message containing content created by a sender;

identifying, by the receiving email client in dependence upon the email message, an edit authority value established by the sender of the email message for that content;

receiving, by the receiving email client from a recipient of the email message, an instruction to forward the received email message;

receiving, by the receiving email client from the recipient, an instruction to edit the content created by the sender contained in the received email message;

determining, by the receiving email client in dependence upon the edit authority value, whether to allow the recipient to edit the content;

if the recipient is not allowed to edit the content, forwarding, by the receiving email client, the email message without altering the content created by a sender;

if the recipient is allowed to edit the content, determining, by the receiving email client in dependence upon the edit authority value, whether to enforce edit tracking in the content; and receiving edits from the recipient, including the edits in the content created by the sender with edit tracking, and forwarding, the email message with the recipient's edits tracked if edit tracking is enforced; or receiving edits from the recipient, including the edits in the content created by the sender without edit tracking, and forwarding the email message with the recipient's edits untracked if edit tracking is not enforced.

9. The apparatus of claim 8 wherein the computer memory also has disposed within it computer program instructions capable of receiving, by a sending email client from a sender, an edit authority value for the email message containing content created by the sender.

10. The apparatus of claim 8 wherein computer program instructions capable of: identifying, by the receiving email client in dependence upon the email message, an edit authority value established by the sender of the email message for that content further comprise computer program instructions capable of reading the edit authority value from a header field of the email message.

11. The apparatus of claim 8 wherein computer program instructions capable of forwarding the email message with the recipient's edits tracked if edit tracking is enforced further comprise computer program instructions capable of sending a courtesy copy of the forwarded email message to the sender.

12. The apparatus of claim 8 wherein computer program instructions capable of forwarding the email message with the recipient's edits untracked if edit tracking is not enforced further comprise computer program instructions capable of sending a courtesy copy of the forwarded email message to the sender.

13. The apparatus of claim 8 wherein computer program instructions capable of forwarding the email message without altering the content created by a sender further comprise computer program instructions capable of including with the email message an integrity notification identifying that the content created by the user was not altered.

14. The apparatus of claim 8 wherein computer program instructions capable of forwarding the email message without altering the content created by a sender further comprise computer program instructions capable of sending a courtesy copy of the forwarded email message to the sender.

15. A computer program product for maintaining the integrity of email authorship, the computer program product disposed upon a computer readable storage device, the computer program product comprising computer program instructions capable, when executed, of causing a computer to carry out the steps of:

receiving, by a receiving email client, an email message containing content created by a sender;

identifying, by the receiving email client in dependence upon the email message, an edit authority value established by the sender of the email message for that content;

receiving, by the receiving email client from a recipient of the email message, an instruction to forward the received email message;

receiving, by the receiving email client from the recipient, an instruction to edit the content created by the sender contained in the received email message;

determining, by the receiving email client in dependence upon the edit authority value, whether to allow the recipient to edit the content;

if the recipient is not allowed to edit the content, forwarding, by the receiving email client, the email message without altering the content created by a sender;

if the recipient is allowed to edit the content, determining, by the receiving email client in dependence upon the edit authority value, whether to enforce edit tracking in the content; and receiving edits from the recipient, including the edits in the content created by the sender with edit tracking, and forwarding, the email message with the recipient's edits tracked if edit tracking is enforced; or receiving edits from the recipient, including the edits in the content created by the sender without edit tracking, and forwarding the email message with the recipient's edits untracked if edit tracking is not enforced.

16. The computer program product of claim 15 further comprising computer program instructions capable of receiving, by a sending email client from a sender, an edit authority value for the email message containing content created by a sender.

17. The computer program product of claim 15 wherein computer program instructions capable of identifying, by the receiving email client in dependence upon the email message, an edit authority value established by the sender of the email message for that content further comprise computer program instructions capable of reading the edit authority value from a header field of the email message.

18. The computer program product of claim 15 wherein computer program instructions capable of forwarding the email message with the recipient's edits tracked if edit tracking is enforced further comprise computer program instructions capable of sending a courtesy copy of the forwarded email message to the sender.

19. The computer program product of claim 15 wherein computer program instructions capable of forwarding the email message with the recipient's edits untracked if edit tracking is not enforced further comprise computer program instructions capable of sending a courtesy copy of the forwarded email message to the sender.

20. The computer program product of claim 15 wherein computer program instructions capable of forwarding the email message without altering the content created by a sender further comprise computer program instructions capable of including with the email message an integrity notification identifying that the content created by the user was not altered.

* * * * *